June 10, 1958 — D. A. MACDONALD — 2,837,767
TIRE REPAIR APPARATUS
Filed Sept. 14, 1954 — 2 Sheets-Sheet 1

INVENTOR.
DONALD A. MACDONALD
BY Irwin M. Lewis
ATTORNEY.

June 10, 1958  D. A. MACDONALD  2,837,767
TIRE REPAIR APPARATUS
Filed Sept. 14, 1954  2 Sheets-Sheet 2

INVENTOR.
DONALD A. MACDONALD
BY
Irwin M. Lewis
ATTORNEY.

United States Patent Office 2,837,767
Patented June 10, 1958

2,837,767

TIRE REPAIR APPARATUS

Donald A. MacDonald, Indianapolis, Ind., assignor to United States Rubber Company, New York, N. Y., a corporation of New Jersey Application September 14, 1954, Serial No. 455,849

8 Claims. (Cl. 18—18)

This invention relates to apparatus for repairing punctures in pneumatic tire casings including so-called "tubeless tire" casings.

The primary object of this invention is to provide an apparatus which is of comparatively simple and inexpensive construction and which may be utilized by comparatively unskilled operators to efficiently repair punctures in tire casings by the injection of a vulcanizable compound into the puncture and the vulcanization of the compound so injected under heat and pressure.

Other objects and advantages of the present invention will become apparent from the following description when read in conjunction with the accompanying drawings wherein.

Figures 1, 2, 3:
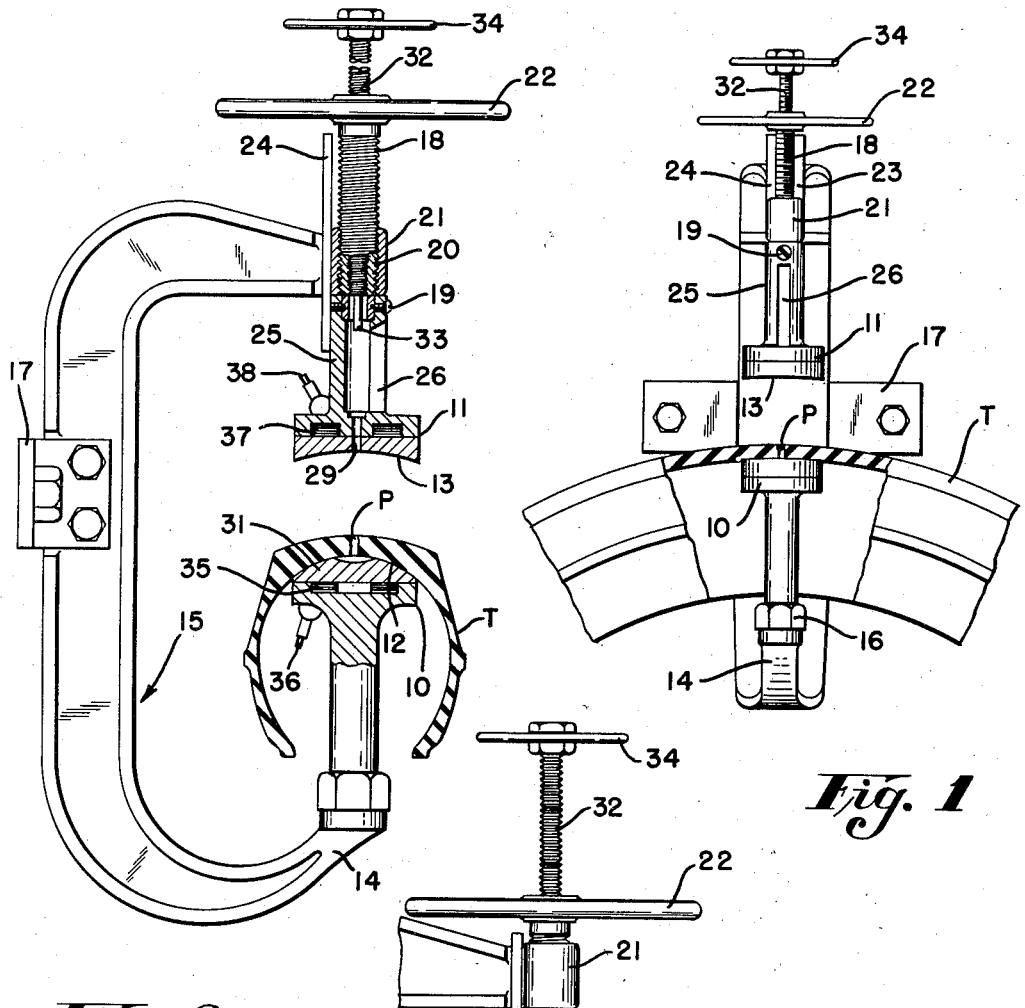
Fig. 1 is a front elevational view of the apparatus of the invention showing a tire casing in position thereon preparatory to operation of the apparatus to repair a puncture through the tread and carcass of the tire casing; for the purpose of illustration, only a portion of the tire casing is shown and parts thereof are broken away to show the engagement of the apparatus therewith.
Fig. 2 is an enlarged side elevational view of the apparatus shown in Fig. 1, with parts thereof broken away to show internal construction.
Fig. 3 is a partial side elevational view of the apparatus showing the tire clamped around the puncture preparatory to injecting the vulcanizable compound into the puncture.

Referring to the drawings, and in particular to Figs. 1 and 2, the apparatus of the invention includes two clamping jaws 10 and 11 providing opposed clamping surfaces 12 and 13 between which a portion of a tire casing T surrounding a puncture P may be clamped. Clamping jaw 10 is removably mounted on the lower arm 14 of a C-shaped frame 15 by means of a threaded collar 16 and the clamping surface 12 thereof has a contour corresponding approximately to that of the interior surface of the casing T. The frame 15 is provided with the bracket 17 by which it may be secured to a wall or other supporting structure.

The jaw 11 is removably and rotatably secured to the lower end of an externally and internally threaded hollow shaft 18 by means of set screws 19. Hollow shaft 18 is threaded into an internally threaded opening 20 through the end of the upper arm 21 of the frame 15. Rotation of shaft 18 by means of a hand wheel 22 secured to upper end thereof therefore serves to move the jaw 11 towards and away from the jaw 10 to clamp the tire casing C therebetween as shown in Fig. 3. The clamping surface 13 of jaw 11 has a contour corresponding approximately to that of the outer thread surface of the tire casing T.

Figure 4:
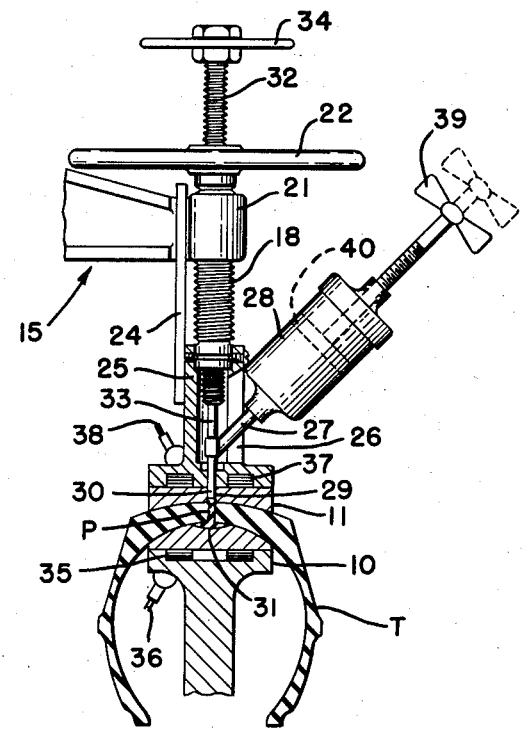
Fig. 4 is a partial side elevational view of the apparatus showing the nozzle of an injection gun clamped in position for injection of a vulcanizable compound into the puncture.

Spaced guide plates 23 and 24 secured to stem 25 of jaw 11 and extending up each side of the arm 21 of the clamp 15, prevent the jaw 11 from turning as the shaft 18 is turned by hand wheel 22. The stem 25 of the jaw 11 is hollow and is provided with a side opening 26 through which the nozzle 27 of an injection gun 28 may be introduced as shown in Fig. 4. An opening 29 is provided through the jaw 11 through which a vulcanizable compound may be injected into the puncture P. The particular injection gun 28 shown is a screw type grease gun modified by the addition of an angular extension 30 which is adapted to fit into the opening 29. It is to be understood, however, that other types of injection guns can be used. The lower jaw 10 is provided with a recess 31 in the surface 12 thereof into which some of the compound flows when injected into the puncture P so as to form a retaining head or button on the plug formed in the puncture.

Figure 6:
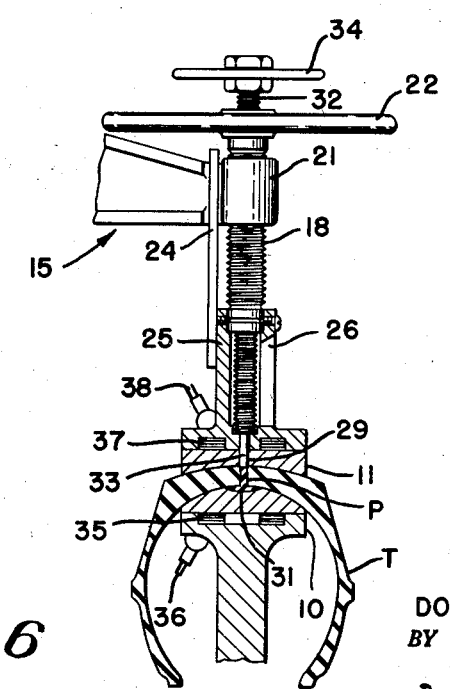
Fig. 6 is a partial side elevational view of the apparatus showing the injected compound being vulcanized under heat and pressure.

An externally threaded shaft 32 is threaded into the hollow shaft 18 and has secured to its lower end a pin or rod 33 of a diameter to closely fit the opening 29 and of a length to extend through the opening 29 and project a short distance from the clamping face 13. Axial movement of the pin or rod 33 is effected by rotation of the shaft 32 by means of a hand wheel 34 secured to the upper end thereof. As will hereinafter be described in detail, the pin or rod 33 provides at least two distinct functions. First, it serves to clamp the nozzle of the injection gun 28 in the opening 29 during injection of a vulcanizable compound into the puncture P. Second, it serves to apply pressure ot the injected compound during the heating and vulcanizing of the compound as shown in Fig. 6.

Clamping jaw 10 is heated by a suitable electric resistant type heating element 35 carried in the interior thereof, as shown in Fig. 2, and adapted to be connected to a suitable source of electrical energy (not shown) by means of leads 36 which extend externally of the jaw. Jaw 11 is adapted to be similarly heated by means of a heating element 37 carried in the interior thereof and adapted to be connected to a suitable source of electrical energy (not shown) by means of leads 38 extending exterior of the jaw 11.

Operation

The puncture P through the tread of a tire casing T is prepared for repairing by first reaming out the hole with a rat tail file or rotary rasp and applying vulcanizing cement into the puncture. The inner surface or band ply of the tire immediately surrounding the puncture is then lightly buffed and vulcanizing cement applied thereto.

The tire casing T is then placed over the lower jaw 10 with the puncture P centered as nearly as possible over the recess 31 in the face 12 thereof as shown in Figs. 1 and 2.

Hand wheel 22 is next turned until face 13 of clamp 11 is almost in contact with tread surface. A pointed right angle awl 41 is then inserted through opening 26 in stem 25 and through opening 29 to locate puncture P directly under opening 29 in clamp 11 as shown in Fig. 3. With the awl still in the puncture P, the tire casing T is clamped tightly between face 13 of jaw 11 and face 12 of jaw 10 by turning hand wheel 22. The awl 41 is then removed.

The extension 30 of the nozzle 27 of the injection gun 28 is next inserted through the side opening 26 in the side of the stem 25 and into the opening 29 through the jaw 11 as shown in Fig. 4.

Pin 33 is then moved down by turning hand wheel 34 until the end thereof contacts the top of nozzle 27. This holds extension 30 in tight contact with puncture P while the vulcanizable compound is injected.

Injection of the vulcanizable compound is accomplished by turning handle 39 of the injection gun 28 in a direction to move the piston 40 thereof towards the nozzle 27. Various vulcanizable compounds, well known to those skilled in the art, may be used. A vulcanizable compound consisting of the following has been found to be particularly useful for this purpose:

| Vulcanizable compound: | Parts by weight |
|---|---|
| Polychloroprene rubber (Neoprene KNR) | 100.00 |
| Antioxidant (Neozone D) | 2.00 |
| Magnesium oxide (Maglite M) | 4.00 |
| Carbon black (Thermax) | 100.00 |
| Stearic acid | 1.00 |
| Zinc stearate | 1.00 |
| | 208.00 |

Injection of the compound is continued until the recess 31 and the puncture P are both filled. This is indicated by the resistance to the turning of the handle 39 of the injection gun 28.

Figure 5:
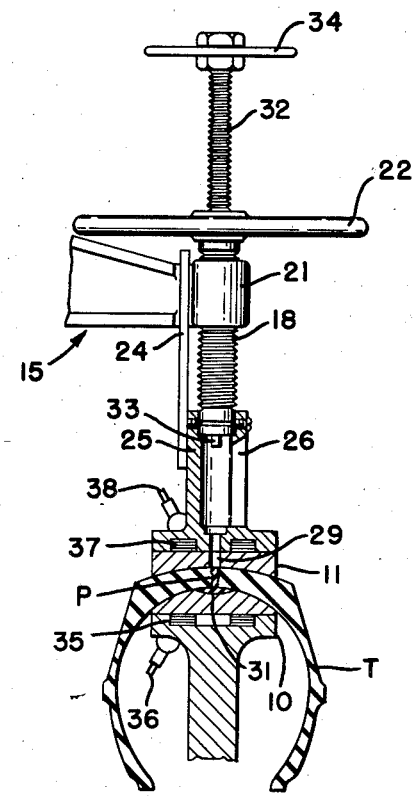
Fig. 5 is a partial side elevational view of the apparatus showing the puncture filled with the vulcanizable compound and the injection gun removed.

After the compound has been injected, the hand wheel 34 is turned to retract the pin or rod 33 and the gun removed as shown in Fig. 5.

Hand wheel 34 is next turned to move the pin or rod 33 through the opening 29 in the jaw 11 to thereby place the injected compound under pressure. The injected stock is so held under pressure and heated by means of heating elements 35 and 37 for about 20 minutes at about 298° F., so that the stock becomes integrally vulcanized with the tire. At the end of this period, the clamping jaw 11 is retracted by turning hand wheel 22 and the tire removed. The bead or button formed by the recess 31 becomes permanently vulcanized to the inside surface or band ply of the tire carcass C and serves to increase the effectiveness of the repair.

While the separate awl 41 is preferred for centering the puncture with the opening 29 of jaw 11 because it is easier to manipulate, the end of the pin or rod 33 may be used for the same purpose by initially projecting it beyond the clamping face 13.

From the above description, it can be seen that there is provided apparatus for repairing punctures in pneumatic tire casings, including so-called "tubeless tire" casings which is of comparatively simple and inexpensive construction and which may be utilized by comparatively unskilled operators to efficiently and effectively repair punctures in a tire casing.

While a preferred form of the invention has been shown and described, it is to be understood that this is for the purpose of illustration only and that changes in modification may be made therein without departing from the spirit and scope of the invention.

Having thus described my invention, what I claim and desire to protect by Letters Patent is:

1. Apparatus for repairing a puncture in a tire casing comprising, a pair of clamping jaws providing opposed clamping surfaces between which a section of a tire casing surrounding a puncture therethrough may be clamped, means for moving said clamping jaws toward and away from each other, an opening through the clamping surface of one of said jaws through which a vulcanizable compound may be injected into said puncture, a pin mounted for movement into said opening for clamping the nozzle of an injection gun in said opening and for applying pressure to stock injected in said puncture after said injection gun is removed.

2. Apparatus for repairing a puncture in a tire casing comprising, a pair of clamping jaws providing opposed clamping surfaces between which a section of a tire casing surrounding a puncture therethrough may be clamped, means for moving said clamping jaws toward and away from each other, an opening through the clamping surface of one of said jaws through which a vulcanizable compound may be injected into said puncture to form a plug, a recess in the surface of the other of said jaws in alignment with and of a larger diameter than said opening through the surface of said one of said jaws into which some of said compound can flow to thereby form a head on said plug, a rod mounted for movement through said opening, means for moving said rod to clamp the nozzle of an injection gun in said opening and for applying pressure to compoud injected into said puncture when said injection gun is removed, and means for heating said jaws to vulcanize said compound injected into said puncture and recess.

3. Apparatus for repairing a puncture in a tire casing comprising, a pair of clamping jaws providing opposed clamping surfaces between which a section of a tire casing surrounding a puncture therethrough may be clamped, means for moving said clamping jaws toward and away from each other, one of said jaws having a hollow stem and an opening through a side thereof through which the nozzle of an injection gun may be inserted, and an opening through the clamping surface of said one of said jaws communicating with the interior of said hollow stem, a rod mounted for movement through said hollow stem and said opening through said clamping surface and means for moving said rod to clamp the nozzle of said injection gun in said opening and for applying pressure to compound injected into said puncture.

4. Apparatus for repairing a puncture in a tire casing comprising, a pair of clamping jaws providing opposed clamping surfaces between which a section of a tire casing surrounding a puncture therethrough may be clamped, means for moving said clamping jaws toward and away from each other, one of said jaws having a hollow stem and an opening through a side thereof through which the nozzle of an injection gun may be inserted, an opening through the clamping surface of said one of said jaws communicating with the interior of said hollow stem, a recess in the surface of the other of said jaws in alignment with and of a larger diameter than said opening through the surface of said one of said jaws into which some of said compound can be injected to form a head on said plug, a rod mounted for movement through said hollow stem and said opening through the surface of said one of said jaws and means for moving said rod to clamp said nozzle of said injection gun in said opening through said surface of said one of said jaws and to apply pressure to the compound injected into said puncture after said injection gun has been removed.

5. Apparatus for repairing a puncture in a tire casing comprising, a pair of clamping jaws providing opposed clamping surfaces between which a section of a tire casing surrounding a puncture therethrough may be clamped, means for moving said clamping jaws toward and away from each other, one of said jaws having a hollow stem and an opening through a side thereof through which the nozzle of an injection gun may be inserted, an opening through the clamping surface of said one of said jaws communicating with the interior of said hollow stem, a recess in the surface of the other of said jaws in alignment with and of a larger diameter than said opening through the surface of said one of said jaws into which some of said compound may be injected to thereby form a head on said plug, a rod mounted for movement through said hollow stem and said opening through said surface of said one of said jaws, means for moving said rod to clamp said nozzle of said injection gun in said opening through said one of said surfaces of said one of said jaws and to apply pressure to compound injected in said puncture when said injection gun is removed, and means for heating said jaws to vulcanize compound injected in said puncture and said recess.

6. A frame, a first clamping jaw mounted on said frame, a hollow shaft threaded in said frame and movable by rotation thereof toward and away from said first clamping jaw, a second clamping jaw having a hollow stem rotatably secured to the end of said hollow shaft, an opening through said second jaw communicating with the interior of said hollow stem, an opening through the wall of said hollow stem through which the nozzle of an injection gun may be introduced, a second shaft threaded into said hollow shaft and movable axially by rotation thereof, and a rod secured to the end of said second shaft and movable therewith.

7. A frame, a first clamping jaw mounted on said frame, a hollow shaft threaded in said frame and movable by rotation thereof toward and away from said first clamping jaw, a second clamping jaw having a hollow stem rotatably secured to the end of said hollow shaft, an opening through said second jaw communicating with the interior of said hollow stem, a recess in the surface of said first clamping jaw in alignment with said opening through the said second clamping jaw, an opening through the wall of said hollow stem through which the nozzle of an injection gun may be introduced, a second shaft threaded in said hollow shaft and movable axially by rotation thereof, a rod secured to the end of said second shaft and movable therewith.

8. A frame, a first clamping jaw mounted on said frame, a hollow shaft threaded in said frame and movable by rotation thereof toward and away from said first clamping jaw, a second clamping jaw having a hollow stem rotatably secured to the end of said hollow shaft, an opening through said second jaw communicating with the interior of said hollow stem, a recess in the surface of said first clamping jaw in alignment with and of a larger diameter than said opening through said second clamping jaw, an opening through the wall of said hollow stem through which the nozzle of an injection gun may be introduced, a second shaft threaded in said hollow shaft and movable axially by rotation thereof, a rod secured to the end of said second shaft and movable therewith, said rod being of a diameter to closely fit the opening through said second jaw and of a length to project through said opening through said second jaw upon axial movement of said second shaft and means for heating said jaw.

References Cited in the file of this patent

UNITED STATES PATENTS

| | | |
|---|---|---|
| 1,396,090 | Bartlett | Nov. 8, 1921 |
| 1,515,177 | Seelye et al. | Nov. 11, 1924 |
| 1,718,485 | O'Sullivan | June 25, 1929 |
| 2,313,108 | Wertz | Mar. 9, 1943 |
| 2,335,528 | Neils | Nov. 30, 1943 |
| 2,408,285 | Ashbaugh | Sept. 24, 1946 |
| 2,426,767 | Dupont | Sept. 2, 1947 |
| 2,436,122 | Rotsler | Feb. 17, 1948 |
| 2,646,707 | Notz | July 28, 1953 |